United States Patent [19]

Keckler et al.

[11] Patent Number: 5,192,453
[45] Date of Patent: Mar. 9, 1993

[54] WET OXIDATION PROCESS FOR ACN WASTE STREAMS

[75] Inventors: Kenneth P. Keckler, Broadview Heights, Ohio; Bruce L. Brandenburg, Wausau, Wis.; Joseph A. Momont, Mosinee, Wis.; Richard W. Lehmann, Wasau, Wis.

[73] Assignee: The Standard Oil Company, Cleveland, Ohio

[21] Appl. No.: 817,172

[22] Filed: Jan. 6, 1992

[51] Int. Cl.$^5$ .......................... C02F 1/72; C02F 1/74
[52] U.S. Cl. ................................. 210/761; 210/904; 210/908
[58] Field of Search ............... 210/761, 908, 903, 904; 422/7, 12; 252/387

[56] References Cited

U.S. PATENT DOCUMENTS

| | | | |
|---|---|---|---|
| 2,903,425 | 9/1959 | Zimmermann | 210/63 |
| 2,932,613 | 4/1960 | Huesler et al. | 210/63 |
| 3,772,181 | 11/1973 | Cole et al. | 210/761 |
| 3,907,678 | 9/1975 | Pradt et al. | 210/63 |
| 4,000,068 | 12/1976 | Nelson et al. | 210/50 |
| 4,347,144 | 8/1982 | Bodenbenner et al. | 210/761 |
| 4,350,599 | 9/1982 | Chowdhury | 210/761 |
| 4,384,959 | 5/1983 | Bauer et al. | 210/739 |
| 4,692,252 | 9/1987 | Atwood et al. | 210/761 |

FOREIGN PATENT DOCUMENTS

| | | | |
|---|---|---|---|
| 5267 | 1/1976 | Japan | 210/761 |
| 30695 | 2/1989 | Japan | 210/761 |

OTHER PUBLICATIONS

S. L. Lade et al., "Sustainable Development At Work: Operating Experience with the Zimpro Wet Oxidation Plant", Oct. 1991.

Leigh Environmental, "Leigh Announces Wet Air Oxidation Plant in UK", Sep. 1990.

The Reactor Magazine, "Industrial Waste Water Treatment, Helping Steel Kick the Coke Oven Gas Habit", No. 41, Feb. 1979.

"Reactor/Wastewater Treatment News From Zimpro/Passavant Inc."; No. 68, Jun. 1990.

"Lo Prox (Low Pressure Wet Oxidation for Waste Water Pretreatment)", Bertrams.

*Primary Examiner*—Wilbur Bascomb, Jr.
*Assistant Examiner*—Neil M. McCarthy
*Attorney, Agent, or Firm*—Michael F. Esposito; Larry W. Evans

[57] ABSTRACT

A process is disclosed which limits the corrosion of the materials of construction of a wet oxidation system treating wastewaters. The process is particularly useful in the wet oxidation treatment of ammonium sulfate containing wastes such as acrylonitrile wastewaters. The wastewater is mixed with an oxygen containing gas such that a substantial residual oxygen gas concentration is maintained from before the stream-gas mixture is heated for wet oxidation until after the oxidized stream-gas mixture is cooled and separated. Preferably, in the treatment of acrylonitrile waste water the shutdown procedure comprises cooling said waste stream by introducing an aqueous liquid substantially free of organic impurities and containing a basic material.

9 Claims, 2 Drawing Sheets

WET OXIDATION FLOW DIAGRAM

WET OXIDATION PROCESS FOR ACN WASTE STREAMS

BACKGROUND OF THE INVENTION

The present invention is directed to a wet oxidation procedure for treatment of waste streams to remove organic impurities and substantially limit corrosion of the materials utilized in the practice of the procedure. In particular, the present invention is directed to a wet oxidation procedure for the treatment of acrylonitrile waste streams to remove organic impurities.

Wet oxidation is a well established process for treating aqueous waste waters, sludges and slurries which contain oxidizable substances. Many patents and publications disclose wet oxidation processes using air as a source of oxygen for accomplishing the oxidation. In addition, other patents disclose the application of pure oxygen or an oxygen enriched gas in a wet oxidation procedure. See for example U.S. Pat. Nos. 4,384,959; 3,042,489; 3,097,988; 3,654,070; 3,359,200; 3,272,740; 4,395,339 and 4,744,909.

Increased reaction rates and the opportunity to operate at lower pressures and temperatures has made the use of oxygen enriched gas/pure oxygen very attractive from a theoretical standpoint. In addition, many potential users of wet oxidation processes, such as sewage treatment plants, steel mills, etc., have existing oxygen generation/storage facilities making the gas available at low cost. However, in spite of these facts wet oxidation processes using enriched/pure oxygen are difficult to operate because of safety considerations and associated corrosion problems.

Pure oxygen or oxygen enriched gas can be used to enhance the rate and completeness of oxidation. However, the presence of oxygen at higher concentrations, especially high purity oxygen is likely to raise concerns regarding spontaneous combustion when placed in contact with organic or other oxidizable substances at pressures above atmospheric, indeed, even at room temperature. Therefore, it is absolutely vital to control the wet oxidation process parameters when using oxygen enriched systems to minimize the hazardous operating conditions and corrosion problems associated therewith. The present invention is directed to a safe, economical means of oxidizing organic impurities present in waste streams in particular, waste streams generated in the production of acrylonitrile by the use of enriched oxygen which does not require sophisticated materials of construction (i.e., expensive) or elaborate equipment designs.

SUMMARY OF THE INVENTION

It is a primary object of the present invention to provide a wet oxidation procedure for a safe, economical and efficient method of removing organic impurities from waste streams which limits the corrosion of the materials of construction utilized in the process.

It is another object of the present invention to provide a wet oxidation procedure for removing organic impurities from acrylonitrile waste streams which limits the corrosion of the materials of construction utilized in the practice of the process.

It is still another object of the present invention to provide a novel shutdown procedure for a wet oxidation procedure for treating acrylonitrile waste streams.

Additional objects and advantages of the invention will be set forth in the description which follows and in part will be obvious from the description, or may be learned by the practice of the invention. The objects and advantages of the invention may be realized and attained by means of the instrumentalities and combinations particularly pointed out in the claims.

To achieve the foregoing objects in accordance with the purpose of the invention as embodied and broadly described herein, the noncatalytic wet oxidation procedure for substantially removing organic impurities from aqueous waste streams while preventing excessive corrosion of the materials of construction comprises introducing enriched oxygen into the aqueous waste stream in an amount in excess of the stoichiometric requirement of oxygen necessary to react substantially with the organic impurities present in the waste stream to produce relatively harmless products (e.g. $CO_2$, $N_2$ and $H_2O$), heating the aqueous waste stream containing oxygen to a predetermined temperature and pressure for a time sufficient to enable said oxygen to react with the organic impurities in said waste stream to convert substantially all of said impurities to harmless components (e.g. gases such as $CO_2$ and $N_2$) while maintaining an excess of oxygen in said aqueous waste stream.

In a preferred embodiment of the present invention the reaction time is between one-half to two hours.

In a further preferred embodiment of the present invention, the oxygen is maintained at a level of at least 15% greater than the stoichiometric amount required to react with the organic impurities in the waste stream.

In another preferred embodiment of the present invention, the reactor may be selected to include a carbon steel reactor clad (e.g., coated) with stainless steel.

In a further preferred embodiment of the present invention the reactor is made from 316 LSS stainless steel.

In a still further preferred embodiment of the present invention, the process further comprises agitating the mixture of oxygen and waste stream to enhance the reaction.

In still another preferred embodiment of the process of the present invention, the treated waste stream-gas mixture is cooled and then separated into a treated waste stream and non-condensable off gases containing a substantial concentration of residual oxygen.

In another aspect of the present invention, the process is directed to continuous treatment of acrylonitrile aqueous waste streams containing ammonium salts. In this aspect of the invention, the process further comprises a shutdown of the continuous flow wet oxidation system at the operating conditions used to treat the aqueous waste stream containing the organic impurities plus an ammonium salt of strong mineral acids, the wet oxidation process producing a treated waste stream with a pH which is not corrosive to the materials of construction, comprising the steps:

a) maintaining a flow of oxygen containing gas through said continuous flow wet oxidation system; and b) halting the flow of aqueous waste stream containing organic impurities to the wet oxidation system and substituting for the waste stream a flow of aqueous liquid essentially free of organic material and containing a basic substance which maintains the noncorrosive pH of the treated waste stream within said wet oxidation system, said organic material-free liquid thereby causing cooling of said wet oxidation system.

In a preferred embodiment of this aspect of the present invention, the basic substance includes an ammonium salt of a strong mineral acid, ammonium carbonate, ammonium bicarbonate, ammonium hydroxide or ammonia, as well as an alkali metal hydroxide or an alkaline earth metal hydroxide.

Wet oxidation processes for the removal of organic impurities from waste streams have been disclosed previously. Moreover, the utilization of pure oxygen or enriched oxygen streams in wet oxidation procedures has also been disclosed. However, safety considerations as well as the impracticality of these processes due to corrosion of the metal equipment used during the procedures has substantially negated the economics associated with utilization of pure oxygen. The present invention substantially eliminates these problems.

DESCRIPTION OF THE DRAWINGS

The accompanying drawings which are incorporated and form a part of this specification illustrate particular embodiments of the process of the present invention. In the drawings.

DETAILED DESCRIPTION OF THE INVENTION

Figure 1:
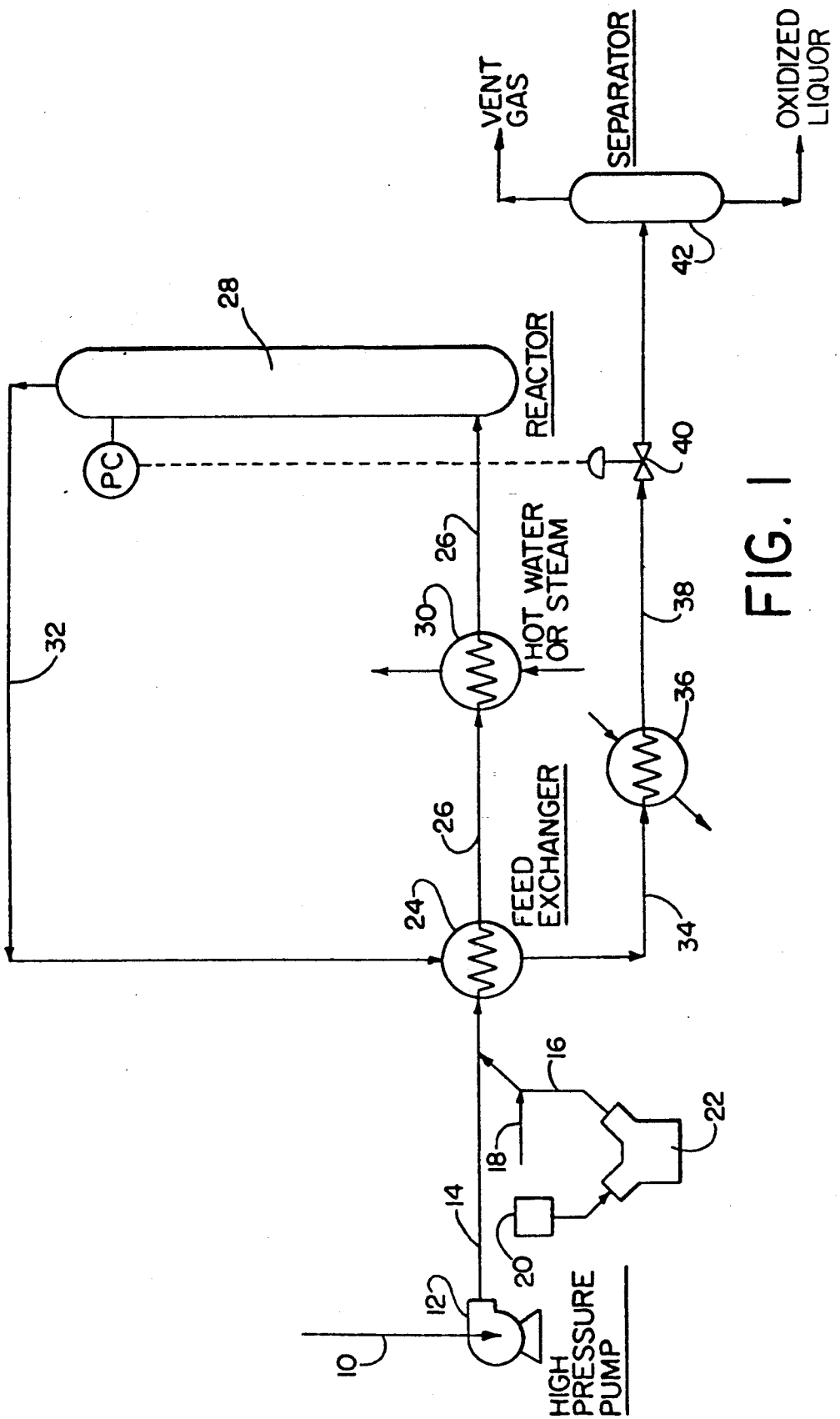
FIG. 1 is a flow diagram of the process of the present invention.

Reference will now be made in detail to the specific embodiments of the present invention with reference to the drawing.

The process of the present invention is a wet oxidation procedure for treatment of aqueous waste stream, in particular, acrylonitrile aqueous waste streams, especially acrylonitrile waste streams containing ammonium sulfate. Preferably, the process utilizes enriched or pure oxygen as the oxidant. By enriched oxygen applicant means a gas mixture having a greater percent of oxygen than that found in air, preferably 50 volume percent $O_2$, especially preferred being 90 volume % oxygen. No catalysts are employed. The operating temperature is between 315°–372° C. (599°–702° F.), preferably, 330°–360° C. (626°–680° F.), most preferably 340°–350° C. (644°–662° F.). The operating pressure is between 1,550–4,500 psi (10,688–31,026 KPa). Preferably, 3,000–3,800 psi (20,684–26,200 KPa) especially preferred being 3,000–3,500 psi (20,684–24,131 KPa). Typically, the residence time in the reactor varies from 30 minutes to about three hours, preferably 30 minutes to about two hours.

The wet oxidation process of the present invention comprises introducing oxygen into an aqueous waste stream in an amount in excess of the stoichiometric requirement of oxygen necessary to react with substantially all the organic impurities present in the waste stream, heating the aqueous waste stream containing oxygen to a predetermined temperature and pressure for a time sufficient to enable the oxygen to react with the organic impurities in the stream to convert substantially all of the impurities to harmless components (e.g., $CO_2$ and $N_2$ gases and $H_2O$) while maintaining said oxygen in said aqueous waste stream at an excess of the stoichiometric amount. It should be understood that any heat generated by the process may be recovered and recycled for energy efficiency. Preferably, the enriched oxygen is maintained at a level of at least 15% greater than the stoichiometric amount required to react with the organic impurities contained in the aqueous waste stream. If heat recovery is not desired, a direct fired heater may be substituted for the feed/effluent exchanger, either entirely or in part.

To avoid the problems associated with corrosion of the metal reactor walls and associated piping during the wet oxidation procedure, the reactor and piping should be made from stainless steel or clad stainless steel, in particular, 316 LSS steel is preferred. In addition, to minimize the corrosion in the reactor, the oxygen should be added to the waste stream prior to entry of the waste product into the feed/effluent exchanger. The entry of the oxygen into the waste stream prior to entry of the stream into the heat exchanger results in a significant portion (e.g. about 35%) of the oxidation reaction occurring in the exchanger. The feed/effluent exchanger provides the residence time for the required heat exchange to occur while also allowing a portion of the organic oxidation to occur.

DESCRIPTION OF THE PREFERRED EMBODIMENTS

With reference to FIG. 1, the process of wet oxidation will now be described in detail. Raw waste stream in a conduit 10 flows to a high pressure pump 12. The pressurized streams from the pump 12 enters a conduit 14 where it mixes with an oxygen containing gas entering from a conduit 16. For safety purposes, a purge water line 18 entering the oxygen gas conduit 16 provides a continuous flow of pure water through the conduit 18 into the waste stream and prevents the stream from entering the oxygen gas supply line should the oxygen gas flow be interrupted. When pure oxygen is used in the process, liquid oxygen from storage vessel 20 is first vaporized in an evaporator 22 prior to mixing with the pressurized waste stream. The amount of oxygen mixed with the stream is in excess of the stoichiometric amount required for complete oxidation of the organic (combustible) impurities (matter) in the stream. Maintaining a substantial excess of oxygen in the stream-gas mixture throughout the wet oxidation system prevents corrosion to the materials of construction of the system.

The pressurized stream-gas mixture is heated by a heat exchanger 24 to a predetermined oxidation temperature. The oxidation temperature ranges from about 315° C. (599° F.) up to about 370° C. (698° F.), just below the critical temperature for water. The system pressure includes the steam pressure plus oxygen containing gas, all at system temperature, and ranges from about 1550 psig (10,688 KPa) to about 4500 psig (31,026 KPa). The operating temperature, pressure and residence time of the system depends on the strength of the waste stream and the degree of treatment required for the oxidized effluent. Higher temperatures, pressures and residence times generally provide for a higher degree of treatment.

The heated stream-gas mixture flows through a conduit 26 into the wet oxidation reactor vessel 28 which provides the residence time for the system where the bulk of the oxidation occurs. An auxiliary heat exchanger 30 provides heating of the feed mixture during start up of the system. The oxidized stream-gas mixture then exits the reactor vessel 28 via a conduit 32 and flows through heat exchanger 24 where it is cooled against incoming raw stream-gas mixture. The cooled oxidized mixture flows from the heat exchanger 24 through a conduit 34 and then through an optional cooler 36 where the mixture may be further cooled. The cooled mixture then flows via a conduit 38 through a pressure control valve 40 where pressure let down occurs. The depressurized mixture enters a separator 42 where it separates into a treated aqueous stream and noncondensible off gases which have a substantial residual oxygen concentration. The presence of a substantial residual oxygen concentration in the off gases limits the amount of corrosion which occurs to the materials of construction of the wet oxidation system. The residual oxygen concentration is preferably in the range of about 5% to about 50% of the off gases, and more preferably in the range of about 5% to about 30% by volume of the off gases.

EXAMPLE

An acrylonitrile wastewater stream was subjected to continuous flow wet oxidation treatment in a system as shown in FIG. 1, constructed of 316 stainless steel, employing pure oxygen as the oxygen containing gas. The acrylonitrile waste stream results from the production of acrylonitrile by the well known ammoxidation process. The acrylonitrile waste stream contains high concentrations of ammonium sulfate, 50-100 g/l, as well as mg/l to g/l concentrations of cyanide, acrylonitrile, acetonitrile, acrylamide, acrolein, pyridine, pyrazole, acrylic acid and acetic acid. Significant amounts of polymeric substances and other noncharacterized material contribute to the Chemical Oxygen Demand (COD) of the waste stream which ranges from 20 to 110 g/l.

Wet oxidation was performed on the acrylonitrile waste stream with the flow rate of aqueous waste through the system ranging from 20 to 40 gallons/hr (1.26 to 2.52 liters/min), resulting in a reactor vessel residence time of 60 to 120 minutes. The reactor temperature ranged from 288° C. to 356° C. (550° F. to 673° F.) and the pressure from 2920 to 3020 psig (20,132 to 20,822 KPa) during steady state periods of operation. Off gas residual oxygen concentration was measured by both a Sybron/Taylor oxygen analyzer and an Engineered Systems and Design Model 8925A-W oxygen analyzer.

Corrosion Testing: To evaluate materials of construction for a wet oxidation system for treating acrylonitrile wastewater stream, samples of various alloys were exposed to the wet oxidation environment and examined for corrosion resistance. Three sets of coupons were placed in the wet oxidation reactor vessel using a long threaded rod, nuts and washers. One set was located near the reactor vessel inlet, one set in the liquid near the outlet of the reactor vessel and the last set was placed in the vapor space near the top of the reactor. Each set contained nine different alloys. These included stainless steel 304-L and 316-L, "super" stainless steel 825, 904-L, and 20-CB3, nickel base alloy G-30 and C-22, as well as titanium alloy Ti-2 and Ti-7.

Period A: Operation of the system for 204 hours at 288° C. to 343° C. (550° F. to 650° F.) and 3,000 psig (20,684 KPa) with excess oxygen present showed no localized corrosion of coupons with the exception of nickel base alloy C-22 which was unsuitable for further consideration.

Period B: Operation of the system for 306 hours at 315° C. to 343° C. (600° F. to 650° F.) and 3,000 psig (20,684 KPa) with several periods of oxygen deficient operation resulted in severe corrosion of all coupons in the liquid phase except the two titanium samples, Ti-2 and Ti-7. Titantium alloy is not coded for use above 315° C. (600° F.) however.

Period C: Operation of the system for 333 hours at 349° C. (660° F.) and 3,000 psig (20,684 KPa) with oxygen concentration maintained in the range of 19% to 38% throughout the test period gave the following results. Stainless steel and "super" stainless steel samples satisfactory, nickel base alloy samples unsatisfactory and titanium samples resistant to corrosion but unsuitable for use above 315° C. (600° F.).

Oxidation Results: Some representative oxidation results for Periods A, B and C are shown in Tables 1 and 2 set forth below. The specific operating conditions under which the effluent samples were produced are as follows:

Period A: 310° C./30 min. Residence Time/2975 psig
Period B: 349° C./90 min. Residence Time/3000 psig
Period C: 349° C./60 min. Residence Time/3000 psig COD reductions ranged from about 75% to 310° C. to over 96% at 349° C. Nonpurgable organic carbon (NPOC) reductions likewise ranged from about 60% to over 97% with increasing oxidation temperature. Removals of the specific compounds acrylonitrile, acetonitrile, acrylamide and cyanide were generally in excess of 99% for these three test periods.

Wet oxidation treatment of acrylonitrile wastewaters streams can result in formation of pyridine and pyrazole, heterocyclic nitrogen containing compounds, as was observed for Period C. At residual oxygen concentrations below about 30%, generally, a ten fold increase in pyridine concentration and a three to four fold increase in pyrazole concentration is observed upon wet oxidation treatment of acrylonitrile wastewater, as shown in Table 2 for Period C. Applicants have discovered that maintaining the residual oxygen concentration in the offgasses at 30% to about 50% results in minimal increase in the concentrations of pyridine and pyrazole in the oxidized wastewater.

For a period of approximately 33 hours, the residual oxygen concentration in the off gases averaged about 34.4% while feed and effluent pyridine concentrations averaged 38 mg/l and 129 mg/l respectively for this time period. The feed and effluent pyrazole concentrations averaged 207 mg/l and 319 mg/l respectively for this 33 hour period. Although it is more costly to maintain the 30% to 50% residual oxygen concentration, excessive formation of these heterocyclic nitrogen compounds is not desirable.

TABLE 1

| Parameter | OXIDATION RESULTS (all values in g/l) | | |
|---|---|---|---|
| | Feed | Effluent | % Reduction |
| | Period A | | |
| COD | 52.32 | 13.12 | 74.9 |
| BOD | 9.33 | 7.71 | 17.4 |
| NPOC | 15.79 | 6.34 | 59.8 |
| pH | 5.00 | 7.60 | — |
| | Period B | | |
| COD | 60.92 | 3.83 | 93.7 |
| BOD | 13.82 | 0.61 | 95.6 |
| NPOC | 22.30 | 2.08 | 90.7 |
| pH | 5.92 | 7.52 | — |
| | Period C | | |
| COD | 75.34 | 2.86 | 96.2 |
| BOD | — | — | — |
| NPOC | 27.70 | 0.79 | 97.1 |
| pH | 5.66 | 8.16 | — |

TABLE 2

OXIDATION RESULTS
(all values in mg/l)

| Compound | Feed | Effluent | % Reduction |
|---|---|---|---|
| Period A | | | |
| Acrylonitrile | 2480 | 0.0025 | 99.99+ |
| Acetonitrile | 2050 | 0.052 | 99.99+ |
| Acrylamide | 1053 | 76.3 | 92.75 |
| Pyridine | — | — | — |
| Pyrazole | — | — | — |
| Cyanide | 4510 | 2.5 | 99.94 |
| Period B | | | |
| Acrylonitrile | 728 | <0.0025 | >99.99 |
| Acetonitrile | 104 | 13.8 | 86.73 |
| Acrylamide | 1080 | 5.5 | 99.50 |
| Pyridine | — | — | — |
| Pryazole | — | — | — |
| Cyanide | 1460 | 0.65 | 99.96 |
| Period C | | | |
| Acrylonitrile | .403 | <0.15 | >99.96 |
| Acetonitrile | 2760 | 7.0 | 99.25 |
| Acrylamide | 1570 | 1.6 | 99.90 |
| Pyridine | 56.4 | 602. | (1067) |
| Pyrazole | 282 | 687. | (244) |
| Cyanide | 4300 | 1.35 | 99.97 |

In another aspect of the present invention, the process of wet oxidation is directed to treatment of aqueous waste stream containing ammonium salts, in particular acrylonitrile waste streams containing ammonium sulfate.

Figure 2:
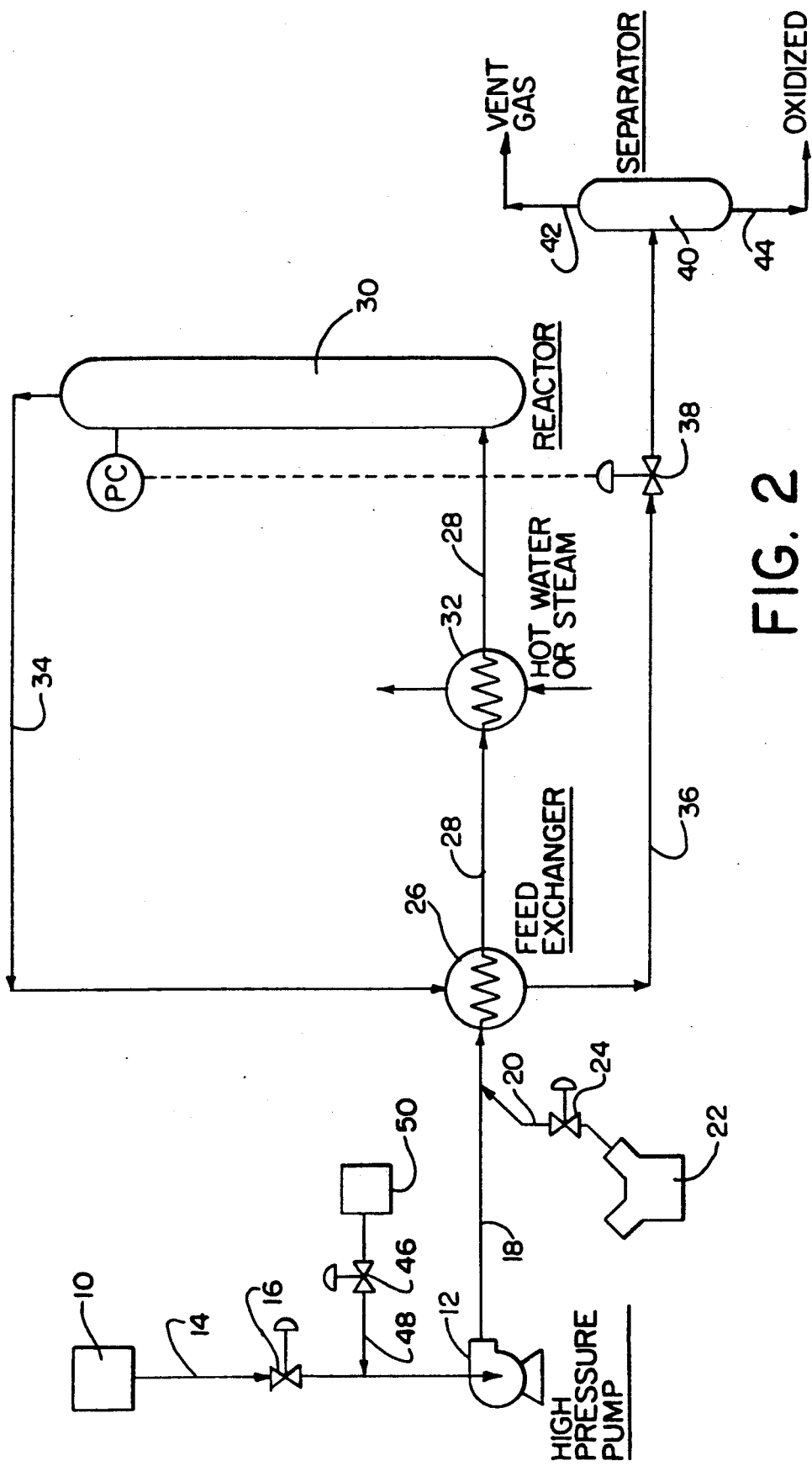
FIG. 2 is a flow diagram for the wet oxidation process used for the treatment of waste stream containing ammonium salts.

FIG. 2 shows a general schematic flow diagram for a continuous wet oxidation system used to treat these types of waste stream.

Referring to FIG. 2, the waste stream contained in a feed tank 10 is supplied to a high pressure pump 12 through a conduit 14 which has a control valve 16. With the valve 16 open, the pump 12 supplies pressurized waste stream to a conduit 18 where the stream is mixed with a pressurized oxygen containing gas from a conduit 20 supplied by an oxygen gas source 22. The oxygen containing gas can be pure oxygen, oxygen enriched air or air. In the case where pure oxygen is used, the oxygen gas source is a liquid oxygen storage tank plus an evaporator to vaporize the liquid oxygen. The oxygen containing gas flow is controlled by a valve 24 in the conduit 20.

The waste stream-gas mixture in the conduit 18 then enters a heat exchanger 26 which heats the stream-gas mixture to operating temperature by exchange against hot, oxidized effluent. The heated stream-gas mixture then flows through a conduit 28 and enters a reactor vessel 30. An auxiliary heat exchanger 32 is positioned in the conduit 28 to provide heating of the stream-gas mixture during system startup. Normal operating temperatures for the wet oxidation are 315° to 370° C. (599°-698° F.) with pressures of 1550 to 4500 psig (10,688-31,026 KPa).

The reactor vessel 30 provides the residence time in the system where the bulk of the wet oxidation reaction occurs. The oxidized stream-gas mixture then exits the reactor vessel via a conduit 34 and then traverses the heat exchanger 26 where it is cooled against incoming raw stream-gas mixture. The cooled, oxidized gas-stream mixture flows through a conduit 36 to a pressure let down valve 38 and thence to a separator vessel 40 where gas and liquid phases are disengaged. The gases exit the separator by an upper conduit 42 and the oxidized stream by a lower conduit 44.

In order to shut down the operating wet oxidation system, the general procedure is to switch the feed material from ammonium salt containing stream to essentially clean water which ceases the oxidation and thereby cools the system. The switch in feed material is made by closing the feed tank valve 16 and opening the dilution water control valve 46 which controls dilution water supplied to the pump 12 via a conduit 48 from a tank 50. The oxygen flow is continued during the shutdown process to prevent corrosion which can occur when insufficient oxygen is present to oxidize the remaining stream in the wet oxidation system.

It was discovered that in following this shutdown procedure using clean water, the pH of the oxidized ammonium salt containing stream dropped from 7 to 8 down to about pH 1 to 2. This pH decrease was unexpected since the feed pH was also around 7 to 8. The pH drop in the oxidized effluent can cause excessive corrosion to the materials of construction of the wet oxidation system.

To counteract this pH drop, a basic material is added to the dilution water. This substance can be an ammonium salt of a strong acid, such as ammonium sulfate or phosphate, or an ammonium salt of a weak acid such as ammonium carbonate or bicarbonate. The basic substance can be ammonia itself or ammonium hydroxide, that is, ammonia dissolved in the dilution water. The basic substance can be alkali metal hydroxides such as sodium or potassium hydroxide, or alkaline earth hydroxides such as magnesium or calcium hydroxide, although the alkaline earth hydroxides are less desirable since they may cause scaling problems in the system.

The preferred basic material added to the dilution water is an ammonia containing substance such as ammonium carbonate or bicarbonate. Once the dilution water with the ammonia containing substance enters the system, the ammonia enters the vapor phase and is transported through the system to any low pH area where it is absorbed by the acidic species. Thus the ammonia does not require the hydraulic detention time to traverse the system, only the gas detention time.

An alternative embodiment of the invention includes the use of wet oxidized effluent from the treatment system during shutdown. In this case, the oxidized effluent contains essentially no combustible matter but does contain the ammonium salt of a strong mineral acid originally present in the waste. A portion of the cooled oxidized effluent is merely stored in the tank 50 until needed for the above described shutdown procedure.

The foregoing description of a preferred embodiment of the invention has been presented for purposes of illustration and description. It is not intended to be exhaustive or to limit the invention to the precise form disclosed and obviously many modifications and variations are possible in light of the above teaching. The embodiment was chosen and described in order to better explain the principles of the invention and its practical application to thereby enable others skilled in the art to best utilize the invention and various embodiments and with various modifications as are suitable to the particular use contemplated. It is intended that the scope of the invention be defined by the claims appended hereto.

What we claim is:

1. A process for noncatalytic wet oxidation of aqueous ammonium sulfate waste stream obtained from an acrylonitrile production plant containing organic impurities, comprising the steps:

a) introducing oxygen into said aqueous waste stream in an amount in excess of the stoichiometric amount required for complete oxidation of the organic impurities present in the stream; and b) heating said aqueous waste stream to a temperature of about 315° C. to about 370° C., and a pressure of about 1550 psig to about 4500 psig for a time sufficient to enable said oxygen present in said waste stream to react with said organic impurities to produce $N_2$, $CO_2$, and $H_2O$ while maintaining said oxygen gas in said aqueous waste stream at an excess of said stoichiometric amount.

2. A process according to claim 1 wherein said amount of oxygen gas in excess of the stoichmetric requirement is between about 5% and 50%.

3. A process according to claim 1 wherein the amount of oxygen gas present in excess of the stoichiometric amount is between 30% to 50% to supress the formation of pyridine and pyrazole in said treated waste stream.

4. A process for noncatalytic wet oxidation of aqueous acrylonitrile ammonium sulfate waste stream containing organic impurities comprising the steps:

a) introducing oxygen into said aqueous waste stream in an amount in excess of the stoichiometric requirement for complete oxidation of the impurities present in the aqueous waste stream;

b) heating the aqueous waste stream to a temperature of about 315° C. to about 370° C., and a pressure of about 1550 psig to about 4500 psig for a time sufficient to enable said oxygen to react with organic impurities to produce $N_2$, $CO_2$ and/or $H_2O$ while maintaining an excess of oxygen gas in said waste stream; and c) maintaining a flow of oxygen through said waste stream; and d) halting the flow of waste stream to the wet oxidation system; and e) cooling the aqueous waste stream by introducing a flow of an aqueous liquid substantially free of organic impurities and containing a basic substance to maintain the pH of the treated stream within said oxidation system above about 2.

5. A process according to claim 4 wherein said basic substance is an ammonium salt of a strong mineral acid.

6. A process according to claim 5 wherein said ammonium salt is ammonium sulfate.

7. A process according to claim 4 wherein the amount of oxygen gas in excess of the stoichiometric amount is between 5% to 50%.

8. A process according to claim 4 wherein the amount of oxygen gas in excess of the stoichiometric amount is between about 5% to 30%.

9. A process according to claim 4 wherein said basic substance is selected from the group consisting of ammonium carbonate and ammonium bicarbonate.

* * * * *